UNITED STATES PATENT OFFICE.

MIDDLETON CRAWFORD, OF COLORADO SPRINGS, COLORADO, ASSIGNOR OF THREE-FOURTHS TO THOMAS C. PARRISH AND DUNCAN CHISHOLM, OF SAME PLACE, AND JAMES POURTALES, OF SILESIA, GERMANY.

PROCESS OF EXTRACTING PRECIOUS METALS FROM THEIR ORES.

SPECIFICATION forming part of Letters Patent No. 543,672, dated July 30, 1895.

Application filed October 29, 1894. Serial No. 527,341. (No specimens.)

*To all whom it may concern:*

Be it known that I, MIDDLETON CRAWFORD, a subject of the Queen of Great Britain, (but having declared my intention of becoming a citizen of the United States,) residing at Colorado Springs, in the State of Colorado, have invented certain new and useful Improvements in the Process of Extracting Precious Metals from Their Ores, (Case A,) whereof the following is a specification.

My invention relates to an improved process for the extraction and recovery of precious metals by means of the solvent action upon said metals of the salts of cyanogen, commonly known as the "cyanide" process.

Generally speaking, the cyanide process consists, first, in lixiviating the pulverized ores with a solution of cyanide of potassium or other similar salts, the result being the formation from a portion of the gold and silver or other precious metal of a soluble aurocyanide of potassium or other corresponding salt which is taken up in the solution, and, second, in separating the precious metals from this solution either by electrolysis or by passing the solution over zinc plates or shavings, whereby the precious metals are precipitated, or by other appropriate means. This process has heretofore usually been applied to what are termed "tailings"—that is, to gangue which has already been treated by an amalgamating process — the amalgamating process, as is well known, being very efficient for the removal of the larger particles of gold, but always failing, more or less, to remove the microscopic or float gold or the gold contained in concentrates, which latter forms are particularly amenable to the cyanide process.

My invention relates especially to the first step in the cyanide process and in the preliminaries thereto, and also to the method and order in accordance with which it may be used in connection with an amalgamating process.

The chief difficulty hitherto incurred in the cyanide process has resulted from the great length of time required to fully dissolve the precious metal in the cyanide solution, requiring, as ordinarily practiced, many days and even weeks. I add to the solution of cyanide of potassium, prior to its employment in the lixiviating process, certain substances by means of which the rate at which the dissolution of the gold or silver is accomplished is greatly facilitated and the quantity capable of being dissolved greatly increased, thereby avoiding this delay.

It has been recognized hitherto that the solution of gold in cyanide of potassium and the consequent formation of an aurocyanide requires the presence of oxygen, the formula by which this reaction takes place being expressed as follows:

$$4Au + 8KCy + 2O = 4KAuCy_2 + 2K_2O,$$

and methods have been experimented with in order to supply this extra molecule of oxygen, but without practical results, the difficulties experienced being twofold. First, the excess of oxygen has been found to be in such unstable combination with the liquid as to be lost almost as rapidly as put into it, or, at least, before it can be made practically available for the purpose of taking up the gold, thus rendering it impossible to use the solution for anything like a continuous process, and, second, the substances which have been added to the cyanide solution for the purpose of thus imparting to it an excess of oxygen have been accompanied by greater or less quantities either on the one hand of acid or on the other hand of alkali, both of which are highly detrimental to, if they do not substantially prevent, the proper carrying out of the process, for the reason, first, that either an acid or alkaline excess in the solution tends to oxidize any base metals which may be present in the ore, so that the cyanide attacks them in preference to the gold, and, secondly, because an excess of acid has a direct tendency to effect the direct decomposition of the cyanide, throwing off hydrocyanic acid.

The chemical substances which I have discovered, and the preparation of one of which I am now about to describe, when added to the cyanide solution, impart to it an excess of oxygen, but as nearly as possible free from either excess of acid or excess of alkali—that is to say, almost absolutely neutral—as a result of which the cyanide solution is rendered capable of dissolving a much larger amount of precious metal to the entire exclusion of the base metals, and in a much shorter time than has heretofore been practicable by the means formerly employed.

I am aware that it has been proposed hitherto to use a solution of dioxide of sodium for this purpose, but such a solution necessarily contains a large excess of alkali. Furthermore, such a solution rapidly gives off its oxygen, whereas a solution prepared in accordance with the means about to be explained I find to be substantially stable and capable of being used over and over again in a continuous process.

Of the chemical compounds which possess the qualifications just described, one is prepared as follows: I mix peroxide of sodium with an equal quantity by weight of sulphuric acid in water, the acid being added first and the peroxide afterward, very slowly. To the clear solution thus formed, sufficient silicate of soda or other corresponding salt is added to neutralize the acids in the solution. Obviously, if the admixture of these ingredients is conducted with sufficient care and watchfulness, the preparation of the solution may be arrested at the moment when complete neutralization has occurred, and in such case it is, of course, unnecessary to take any further steps which presupposes the existence of an excess of acid.

In carrying out my process I add to a weak solution of cyanide of potassium a small quantity of the solution, the preparation of which I have just described, the quantity as well as the strength of the cyanide solution being regulated, to a certain extent, by the nature of the ore which is to be treated.

With the lixiviating solution thus formed, the powdered ore containing the precious metal is lixiviated, and, if necessary, agitated. If the ore is itself found to be either alkaline or acid it should be neutralized prior to the addition of the lixiviating solution.

Although under ordinary circumstances, and in accordance with the methods heretofore employed, the agitation of pulverized ore with a cyanide solution requires to be carried on many days, or even weeks, before the dissolution of the precious metal is sufficiently complete, I find that by reason of the addition to the cyanide of the substance which I have described, I am able to so facilitate the lixiviating process that it occupies but about an hour.

When the lixiviating process has proceeded for the requisite length of time, the gangue and also the solution are withdrawn from the lixiviating vessel, and if the ore which is being treated has contained comparatively coarse particles of the metal, (which particles are incapable of solution by a cyanide process, under any circumstances, within any reasonable time,) the gangue, with its accompanying solution, are passed through an amalgamating process whereby this coarse gold may be reclaimed, which process, in case electrical amalgamation is employed, extracts a certain portion of the dissolved metal also from the solution by precipitation. The tailings are then separated from the solution by any suitable process and the solution treated electrolytically until the dissolved gold is separated therefrom. The residuum of cyanide solution may then be run back, preferably through rubber pipes, to the tank in which it was originally treated and used over again, thus making the process continuous.

I find that by reason of the addition to the cyanide solution of the substance which I have described its tendency to deteriorate is very much decreased, making it thereby possible to continue to use the same solution for a much greater length of time than would otherwise be the case.

The advantages of this process are obvious. The comparatively short time required for the lixiviating process enables the ore to be rapidly run through, so that the quantity of ore which may be treated by a given amount of cyanide is very largely increased. This renders it practicable to apply the cyanide process, not simply to tailings, as has heretofore been done, but to the ore as it comes from the mine, and by combining it with an amalgamating process in the order I have described—that is to say, passing the gangue over the mercury subsequent to its lixiviating with the cyanide—I find that by means of what is practically one continuous process I am able to extract a larger proportion of precious metal from the ore than has hitherto been done by the use of two separate processes.

Having thus described my invention, I claim—

1. The improved process of preparing cyanide solution for the purpose of lixiviating the ores of precious metals, which consists in adding to a cyanide solution a solution of peroxide of hydrogen, which has been substantially neutralized, substantially as described.

2. The improved process of preparing cyanide solution for the purpose of lixiviating the ores of precious metals, which consists in adding to a cyanide solution a solution of peroxide of hydrogen prepared by mixing peroxide of sodium with dilute sulphuric acid and completely neutralizing the same, substantially as described.

3. The improved process of preparing cyanide solution for the purpose of lixiviating the ores of precious metals, which consists in adding to a cyanide solution a solution of peroxide of hydrogen prepared by mixing peroxide of sodium with dilute sulphuric acid and neutralizing by silicate of soda, substantially as described.

4. The improved process of extracting precious metals from their ores which consists, first, in lixiviating the ores with a cyanide solution to which has been added a substantially neutral substance which contains a permanent excess of oxygen; second, in subjecting the gangue and accompanying cyanide solution to an amalgamating process; and, thirdly, in withdrawing the solution from the tailings, and extracting the precious metal therefrom, substantially as described.

MIDDLETON CRAWFORD.

Witnesses:
ELLIS L. SPAEKMAN,
HENRY L. B. WILLS.